US012605911B2

(12) United States Patent
Cai et al.

(10) Patent No.: US 12,605,911 B2
(45) Date of Patent: Apr. 21, 2026

(54) SHOE FORMING METHOD

(71) Applicant: ZHEJIANG HUAFON NEW MATERIALS CO., LTD., Wenzhou (CN)

(72) Inventors: Wu Cai, Wenzhou (CN); Yongxin Bao, Wenzhou (CN); Wandong Cai, Wenzhou (CN); Yebao Zhao, Wenzhou (CN); Xuejun Zhang, Wenzhou (CN); Yu Chi, Wenzhou (CN)

(73) Assignee: Zhejiang Huafon New Materials Co., Ltd., Wenzhou (CN)

( * ) Notice: Subject to any disclaimer, the term of this patent is extended or adjusted under 35 U.S.C. 154(b) by 239 days.

(21) Appl. No.: 18/255,576

(22) PCT Filed: Aug. 3, 2021

(86) PCT No.: PCT/CN2021/110329
§ 371 (c)(1),
(2) Date: Jun. 1, 2023

(87) PCT Pub. No.: WO2022/116580
PCT Pub. Date: Jun. 9, 2022

(65) Prior Publication Data
US 2024/0092046 A1      Mar. 21, 2024

(30) Foreign Application Priority Data

Dec. 2, 2020    (CN) ......................... 202011405723.1
Apr. 9, 2021    (CN) ......................... 202110384179.5

(51) Int. Cl.
B29D 35/04        (2010.01)
B29C 51/10        (2006.01)
(Continued)

(52) U.S. Cl.
CPC .......... B29D 35/0054 (2013.01); B29C 51/10 (2013.01); B29C 51/266 (2013.01);
(Continued)

(58) Field of Classification Search
CPC .... B29D 35/122; B29D 35/128; B29D 35/10; B29C 51/10; B29C 44/0461; B29C 44/06
See application file for complete search history.

(56) References Cited

U.S. PATENT DOCUMENTS 3,156,748 A * 11/1964 Roth ....................... B29C 33/62
264/48
3,187,069 A * 6/1965 Pincus .................... B29C 33/68
297/DIG. 3
(Continued)

FOREIGN PATENT DOCUMENTS

CN        1174778 A      3/1998
CN      102873888        1/2013
(Continued)

OTHER PUBLICATIONS

International Search Report dated Oct. 21, 2021 from corresponding PCT Application No. PCT/CN2021/110329.
(Continued)

*Primary Examiner* — Benjamin A Schiffman
(74) *Attorney, Agent, or Firm* — ArentFox Schiff LLP

(57) ABSTRACT

The present invention relates to a product forming method, a product, and a shoe. The product forming method comprises the following steps: (1) placing a film on a bottom mold, and fixing the film between the bottom mold and a middle frame; (2) placing an outer housing material on the film, and suctioning the film, so that the film is internally recessed in the direction of the bottom mold, and then performing first curing molding to obtain a molded outer housing; and (3) placing an inner liner material on the
(Continued)

molded outer housing, performing second curing molding to obtain a molded inner liner, and demolding to obtain the product.

28 Claims, 3 Drawing Sheets

(51) Int. Cl.
    *B29C 51/26*         (2006.01)
    *B29D 35/00*         (2010.01)
    *B29D 35/12*         (2010.01)

(52) U.S. Cl.
    CPC ............. *B29D 35/04* (2013.01); *B29D 35/12* (2013.01); *B29D 35/122* (2013.01); *B29D 35/128* (2013.01); *B29C 51/265* (2013.01)

(56)            References Cited

U.S. PATENT DOCUMENTS

| | | | | |
|---|---|---|---|---|
| 3,814,781 | A * | 6/1974 | Ola et al. | B29C 33/68 |
| | | | | 264/46.4 |
| 4,031,176 | A * | 6/1977 | Molbert | B29C 33/68 |
| | | | | 264/DIG. 83 |
| 5,843,555 | A * | 12/1998 | Atake | B29C 45/1418 |
| | | | | 428/172 |
| 5,925,302 | A * | 7/1999 | Oono | B29C 45/1418 |
| | | | | 264/553 |
| 6,475,423 | B1 * | 11/2002 | Masterson | B29C 45/14065 |
| | | | | 264/296 |
| 9,636,879 | B2 * | 5/2017 | Yang | B29D 35/122 |
| 10,189,209 | B2 * | 1/2019 | Downs | B29C 66/438 |
| 11,285,657 | B2 * | 3/2022 | Lee | B29D 35/142 |
| 2004/0032042 | A1 * | 2/2004 | Chi | A43B 9/125 |
| | | | | 264/316 |
| 2004/0262819 | A1 * | 12/2004 | Lee | B29D 35/128 |
| | | | | 264/553 |
| 2005/0126038 | A1 * | 6/2005 | Skaja | A43B 23/024 |
| | | | | 36/25 R |
| 2005/0175703 | A1 | 8/2005 | Hunter et al. | |
| 2007/0090575 | A1 * | 4/2007 | Chen | B29D 35/122 |
| | | | | 264/161 |
| 2013/0320579 | A1 * | 12/2013 | O'Donnell | B29C 44/1219 |
| | | | | 264/41 |
| 2015/0257473 | A1 * | 9/2015 | Liu | B29D 35/04 |
| | | | | 36/87 |

FOREIGN PATENT DOCUMENTS

| | | |
|---|---|---|
| CN | 103042648 | 4/2013 |
| CN | 104552674 | 4/2015 |
| CN | 105459318 A | 4/2016 |
| CN | 105538584 A | 5/2016 |
| CN | 105666908 | 6/2016 |
| CN | 105666908 A | 6/2016 |
| CN | 106313409 | 1/2017 |
| CN | 106313409 A | 1/2017 |
| CN | 106377007 | 2/2017 |
| CN | 109130149 A | 1/2019 |
| CN | 208801654 | 4/2019 |
| CN | 109942771 A | 6/2019 |
| CN | 110861252 A | 3/2020 |
| CN | 110900932 | 3/2020 |
| CN | 110900932 A | 3/2020 |
| CN | 111887535 | 11/2020 |
| KR | 10-1424589 B1 | 8/2014 |
| KR | 2016-0051406 A | 5/2016 |

OTHER PUBLICATIONS

Office Action dated Dec. 9, 2023.from corresponding Chinese Patent Application No. 202110384179.5.
Office Action dated Jul. 24, 2024.from corresponding Chinese Patent Application No. 202110384179.5.
Office action dated Sep. 20, 2022 from corresponding Chinese Application No. 202011405723.1.

* cited by examiner

SHOE FORMING METHOD

CROSS-REFERENCE TO RELATED APPLICATIONS

This is a National Stage Application, filed under 35 U.S.C. 371, of International Patent Application No. PCT/CN2021/110329, filed on Aug. 3, 2021, which claims priority to Chinese Patent Application No. 202110384179.5 filed with the China National Intellectual Property Administration (CNIPA) on Apr. 9, 2021, and Chinese Patent Application No. 202011405723.1 filed with the CNIPA on Dec. 2, 2020, the disclosures of which are incorporated herein by reference in their entirety.

TECHNICAL FIELD

The present application belongs to the technical field of product production and relates to a product molding method, a product and a shoe, and a molding method of a pore-free sole, a pore-free sole and a shoe.

BACKGROUND

Foam products have the advantages of light weight and low density, high comfort and high economy due to its foaming properties and have been widely used in various fields such as sole manufacturing, cushioning part manufacturing, automobiles, sports and furniture. At present, foam products are commonly molded in one step, i.e., the material is placed into the mold by pouring, extruding and spraying, and then cured and released under a certain temperature. However, the low density of foam products leads to technical defects including a large number of pores on the husk, poor physical and mechanical properties, poor hydrolysis resistance, and poor weathering and stain resistance, and the defects will be even more obvious when the foam density is too low. The most effective way to solve the technical defects of foam products is vacuum film suction technology, i.e., a deformable film is clamped by a mold with vacuuming function, fixed between the substrate mold and the frame, and then sucked into the mold cavity to attach to a bottom sheet of the mold bottom, and then the foam material is placed in the mold cavity, a mold cover is closed, a fixed part is locked, and the complete film-sucking molding product is obtained after being released from the mold and then trimmed finally.

The products prepared by the above method solve the problems of surface porosity and poor hydrolysis resistance and weather resistance, but also have the use defects of poor stain resistance, easy creasing, and poor wear resistance, and the film thickness is limited by the film and the thickness cannot be adjusted.

In addition, the most effective way to solve the technical defects of foam products include material smearing and mold shaking, that is, evenly smearing the foam material just injected into the bottom to the side walls or shaking the mold to allow the raw material on the bottom to hang on the side walls.

The products prepared by the above methods solve the porosity problem of the simple-mold sides, but also have the following problems: 1) low yield, pores are still easy to appear on the surface after material smearing and mold shaking, especially on the complex-mold surface; 2) high production cost, workers are required for mold shaking or material smearing; 3) low production efficiency, mold shaking and material smearing not only take a certain amount of process time, but also require sufficient curing time for the foam material; and 4) when the molding density is low (<0.25 g/cm$^3$), the peeling problem is easy to appear, which is the technical barrier of the low density of polyurethane foam.

CN105666908A discloses a film-sucking molding method of soles; firstly, the conventional mold is modified to a vacuumizing mold, which has the function of sucking film, then the mold is heated to 45-60° C. via the polyurethane production line, a release agent is sprayed on the mold, then a bottom sheet is put into the bottom of the mold, then a TPU film is hung on a middle frame of the mold, and the middle frame covers the substrate mold, so that the TPU film is clamped between the substrate mold and the middle frame, and a fixed part is locked, the mold with TPU film is heated to 110-160° C. by UV-carbon fiber lampshade irradiation to bring the TPU film to a soft melting point, then soft-melted TPU film is sucked into the mold cavity and attaches to the bottom sheet of the mold bottom, then the mold cavity is filled with foam polyurethane and a mold cover is closed and a second fixed part is locked, the finished mold is transported to an oven set at 80-100° C. arranged on the polyurethane production line and passes through the oven after 5-7 minutes, the mold is opened to take out the complete film-sucking molding sole, and finally the sole is trimmed. The soles obtained by the molding method provided by this application only contain the polyurethane foam layer and polyurethane film covered on the outer surface of the foam layer. The density of the foam layer is required to be large to provide the support performance of the shoes, which reduces the comfort of the shoes to a certain extent, and where the film is sucked is easy to show creases after long wearing, which affects the appearance.

Therefore, it is an urgent need in the field to develop a molding method which produces the product with all the advantages of comfort, wear resistance, no creasing for long time use and weather resistance.

SUMMARY

In view of the shortcomings of the prior art, a first object of the present application is to provide a product molding method, and especially a shoe molding method. The product molding method achieves one-piece molding and no-adhesive process, the product appearance shows all-sided wrap and no-pore, the outer husk wall thickness is adjustable, and the product has a low overall density, high use comfort, and high wear resistance and shows no crease nor adhesive failure after long service.

To achieve the object, the present application adopts the technical solutions below.

The present application provides a product molding method, and the product molding method includes the following steps:

a. placing a film on a substrate mold, and fixing the film between the substrate mold and a middle frame;

b. placing an outer husk material on the film, sucking the film to sag in towards the substrate mold, and performing primary curing molding to obtain a molded outer husk; and c. placing an inner core material in the molded outer husk, performing secondary curing molding to obtain a molded inner core, and releasing the molded inner core to obtain the product.

The present application provides a new product molding method, wherein the outer husk material is placed on the film and then the film is sucked; as the film sags in towards the substrate mold, the outer husk material will flow with the deformation of the film, forming a thin outer husk material layer in the hollow of the film; subsequently, the inner core material is poured and molded in one piece; this method requires no adhesive-brushing process and thus avoids the risk of adhesive failure; in addition, for the method provided by the present application, the thickness of the outer husk can be controlled via the amount and viscosity of the material, and thereby the method is appropriate for different product types, and the product shows no crease after long service.

The product molding method provided by the present application breaks through the technical barrier of conventional foam products such as porosity, high density, poor weather resistance and poor hydrolysis resistance, and realizes one-piece molding, all-sided wrap in appearance, pore-free, adjustable thickness, and low overall density, and has effectively improved weather resistance, wear resistance and hydrolysis resistance.

In the present application, a material of the film is an elastic film material that can be certain deformation.

Preferably, the film is a deformable elastic film, preferably any one of a thermoplastic organic film, a thermosetting organic film or a photocurable organic film, and further preferably any one of an ethylene-vinyl acetate copolymer (EVA) film, a silicone-type film, a polyvinyl chloride (PVC) film, a polyethylene (PE) film, a rubber film, a thermoplastic polyurethane film or a thermosetting polyurethane film.

Preferably, step (1) further includes: coating a surface treating agent on the surface of the fixed film.

Preferably, the surface treating agent is a film anti-adhesive agent. The main effect is to improve the peelability between the outer husk and the film.

Preferably, the surface treating agent includes any one or a combination of at least two of an aqueous release agent, an oil-based release agent or a silicone oil-based additive.

Preferably, the outer husk material includes any one or a combination of at least two of a thermosetting organic material, a photocurable organic material or a thermoplastic organic material.

Preferably, the outer husk material has a melt viscosity of 1000-5000 mPa/s at 20-45° C., such as 1500 mPa/s, 2000 mPa/s, 2500 mPa/s, 3000 mPa/s, 3500 mPa/s, 4000 mPa/s, 4500 mPa/s, 5000 mPa/s, etc.

In a preferred technical solution of the present application, the best wall-hanging effect can be obtained when the viscosity parameter of the outer husk material is within the above range. If the viscosity is too high, the final outer husk will have an excessively large thickness, and the product will have a high overall density; if the viscosity is too low, the outer husk will have an excessively small thickness or be discontinuous, and thus cannot provide good protection to the inner core, affecting the comprehensive performance and appearance of the product.

Preferably, the outer husk material has a density of 0.8-1.5 g/cm$^3$, such as 0.9 g/cm$^3$, 1 g/cm$^3$, 1.1 g/cm$^3$, 1.2 g/cm$^3$, 1.3 g/cm$^3$, 1.4 g/cm$^3$, etc.

Preferably, the inner core material includes any one or a combination of at least two of a thermosetting organic material, a photocurable organic material, a thermoplastic organic material or a rubber-type material.

Preferably, the inner core material has a density of 0.15-0.45 g/cm$^3$, such as 0.2 g/cm$^3$, 0.25 g/cm$^3$, 0.3 g/cm$^3$, 0.35 g/cm$^3$, 0.4 g/cm$^3$, etc.

Preferably, step (1) further includes: heating the substrate mold to 45-65° C., such as 46° C., 47° C., 48° C., 49° C., 50°

C., 51° C., 52° C., 53° C., 54° C., 55° C., 56° C., 57° C., 58° C., 59° C., 61° C., 64° C., etc.

Preferably, in step (2), a method of placing the outer husk material includes one or a combination of at least two of pouring, extruding, spraying, brushing, blow molding or pressing.

Preferably, step (2) further includes: heating the film to 70-120° C. before sucking the film, such as 75° C., 80° C., 85° C., 90° C., 95° C., 100° C., 105° C., 110° C., 115° C., etc. The purpose of the heating is to bring the polyurethane film to a soft melting point and facilitate the subsequent sucking film process.

Preferably, in step (2), the film is heated by infrared ray-carbon fiber lampshade irradiation.

Preferably, in step (2), the sucking film process has a vacuum degree of 0.05 Mpa to −0.1 Mpa, such as 0 Mpa, −0.02 Mpa, −0.004 Mpa, −0.005 Mpa, −0.008 Mpa, −0.009 Mpa, etc. The vacuum degree of the present application refers to a vacuum degree of the space between the film and the substrate mold.

The vacuum degree for the sucking film process is controlled within the above range. Within such range, the outer husk material can have the best wall-hanging effect on the film. If the vacuum degree of the film suction is too low, the wall hanging will be not obvious, the thickness of the outer wall will be small, and the product will have poor overall performance and appearance; if the vacuum degree of the film suction is too high, the outer husk material will hang on the wall too much, and the product will have a high density.

Preferably, in step (2), the sucking film is specifically pumping off the air between the film and the substrate mold.

Preferably, in step (2), the sucking film is performed until the film is attached to the bottom of the substrate mold.

Preferably, in step (2), a method of pumping off the air between the film and the substrate mold is: connecting at least two air outlets at textured sharp corners of the substrate mold, wherein the air outlets are air-communicating connected to a vacuuming system, and then starting the vacuuming system to pump off the air between the substrate mold and the film.

Preferably, in step (2), the film is hold for 0-5 min (such as 1 min, 2 min, 3 min, 4 min, etc.) after being sucked and then subjected to the primary heating molding.

In the present application, there is a standing period of 2-5 min before the heating molding, leaving some time for the outer husk material to flow, and thus the outer husk material can reach the best wall-hanging effect on the film and the bottom outer husk material can have good uniformity. If the flow time is too long, the wall-hanging effect will be unobvious, the outer husk will have small thickness, the product will have degraded wear resistance and service life, and the production efficiency will be reduced; if the flow time is too short, the outer husk material will hang on the wall too much, and the product will have high density and poor levelling uniformity.

Preferably, in step (2), the primary heating molding has a temperature of 45-65° C., such as 46° C., 47° C., 48° C., 49° C., 50° C., 51° C., 52° C., 53° C., 54° C., 55° C., 56° C., 57° C., 58° C., 59° C., 61° C., 64° C., etc.

Preferably, in step (2), the primary heating molding has a time of 2-5 min, such as 2.1 min, 2.4 min, 2.6 min, 2.8 min, 3 min, 3.2 min, 3.6 min, 4.0 min, 4.2 min, 4.5 min, 4.8 min, etc.

Preferably, step (2) specifically includes: heating the film to 70-120° C., pouring the outer husk material onto the film, sucking the film to attach to the bottom of the substrate mold and holding for 0-5 min, and then performing the primary heating molding at 45-65° C. for 2-5 min to obtain the molded outer husk.

Preferably, in step (3), the secondary heating molding is performed at 45-65° C., such as 46° C., 47° C., 48° C., 49° C., 50° C., 51° C., 52° C., 53° C., 54° C., 55° C., 56° C., 57° C., 58° C., 59° C., 61° C., 64° C., etc.

Preferably, in step (3), the secondary heating molding is performed for 2-4 min, such as 2.2 min, 2.4 min, 2.6 min, 2.8 min, 3 min, 3.2 min, 3.4 min, 3.6 min, 3.8 min, etc.

Preferably, step (3) further includes: closing the substrate mold after pouring the inner core material.

Preferably, step (3) specifically includes: pouring the inner core material onto the molded outer husk, closing the substrate mold, performing secondary heating molding at 45-65° C. for 2-4 min to obtain the molded inner core, cooling, and releasing to obtain the product.

Preferably, step (4) is performed after step (3): trimming and arranging the released product, and packaging and storing the product passing inspection.

Preferably, the product molding method includes the following steps:

a. fixing the film between the substrate mold and the middle frame, and optionally coating a surface treating agent on the surface of the film;

b. heating the film to 70-120° C., pouring the outer husk material onto the film, sucking the film to attach to the bottom of the substrate mold and holding for 0-5 min, and then performing the primary heating molding at 45-65° C. for 2-5 min to obtain the molded outer husk;

c. pouring the inner core material onto the molded outer husk, closing the substrate mold, performing the second heating molding at 45-65° C. for 2-4 min to obtain a molded inner core, cooling, releasing, and optionally peeling the film to obtain the product; and d. trimming and arranging the released product, and packaging and storing the product passing inspection.

A second object of the present application is to provide a product obtained by the product molding method according to the first object.

Preferably, the products include a bicycle saddle product, a sole, or a child seat.

A third object of the present application is to provide a shoe including the product according to the second object.

Compared with the prior art, the present application has the beneficial effects below.

The product molding method provided by the present application breaks through the technical barrier of conventional foam products such as porosity, high density, etc., and realizes one-piece molding, all-sided wrap in appearance, pore-free, adjustable thickness, and low overall density. In addition, the product obtained by the molding method provided by the present application has a thinner outer husk on the side and a thicker outer husk on the bottom, and such structure can improve the overall use performance of the product, and the product can still have high use performance even in a case where the inner core material density is low.

In addition, a fourth object of the present application is to provide a molding method of a pore-free sole, and especially a molding method of a midsole without pores and realizing low density and non-peeling at the same time. The molding method can replace the conventional material smearing process, solving the problem that the soles, especially polyurethane soles, have pores on the surface and are low-density and easy to peel, reducing the production cost of foam soles and improving the yield rate of soles.

To achieve the object, the present application adopts the technical solutions below.

The present application provides a molding method of a pore-free sole, and the molding method includes the following steps:

a. placing a film on a substrate mold, and fixing the film between the substrate mold and a middle frame; and b. injecting a foam material on the film, then sucking the film to sag in towards the substrate mold, closing the substrate mold, performing curing molding, and taking out a sole obtained by the curing molding to obtain the pore-free sole.

The present application provides a novel sole molding method, wherein the foam material is first placed on the film, and the film is sucked when its surface is fully covered by the foam material; since the film sags in towards the substrate mold, the foam material will flow with the film deformation and spread to every part of the side and bottom of the mold, the mold is closed then and curing molding is performed; since the mold has been covered with the foam material everywhere, there is no need for additional material smearing and mold shaking process, which reduces production cost and improves the yield rate of products, especially the products with complex shape.

The product molding method provided by the present application breaks through the barrier of conventional foam product surface porosity technology (sucking the film first and then injecting the foam material) and prepares soles without porosity, which has all the advantages of comfort, wear resistance, no creasing for long time use and weather resistance.

Preferably, the film is a deformable elastic film, preferably any one of a thermoplastic organic film, a thermosetting organic film, or a photocurable organic film, or a composite film formed by at least two of them, and further preferably any one of an ethylene-vinyl acetate copolymer (EVA) film, a thermoplastic polyurethane film, a silicone-type film, a polyvinyl chloride (PVC) film, or a polyethylene (PE) film, or a composite film formed by at least two of them Preferably, the foam material includes any one or a combination of at least two of a thermosetting organic material, a photocurable organic material or a thermoplastic organic material.

Preferably, the foam material includes any one or a combination of at least two of foam polyurethane, foam ethylene-vinyl acetate copolymer (EVA), foam polyvinyl chloride (PVC), foam polyethylene (PE) or foam styrene-butadiene-styrene block copolymer (SBS).

Preferably, the foam material has a molding density of 0.1-0.9 g/cm³, such as 0.1 g/cm³, 0.3 g/cm³, 0.5 g/cm³, 0.7 g/cm³, 0.9 g/cm³, etc., preferably 0.1-0.7 g/cm³.

Preferably, step (1) further includes: coating a surface treating agent on the surface of the fixed film.

Preferably, the surface treating agent includes a film anti-adhesive agent. The main effect is to improve the peelability between the sole and the film.

Preferably, the surface treating agent includes any one or a combination of at least two of an aqueous release agent, an oil-based release agent or a silicone oil-based additive.

Preferably, step (1) further includes: heating the substrate mold to 45-65° C. before placing the film.

Preferably, step (1) specifically includes: heating the substrate mold to 45-65° C., then placing the film on the substrate mold, and fixing the film between the substrate mold and the middle frame, and subsequently coating the surface treating agent on the surface of the film.

Preferably, in step (2), a method of injecting the foam material includes one or a combination of at least two of pouring, extruding, spraying, brushing, blow molding or pressing.

Preferably, step (2) further includes: heating the film to 70-120° C. before injecting the foam material, such as 75° C., 80° C., 85° C., 90° C., 95° C., 100° C., 105° C., 110° C., 115° C., etc. The purpose of the heating is to bring the polyurethane film to a soft melting point and facilitate the subsequent sucking film process.

Preferably, a method of heating the film includes using infrared ray-carbon fiber lampshade irradiation.

Preferably, in step (2), the sucking film process has a vacuum degree of −0.001 Mpa to −0.1 Mpa between the film and the substrate mold, such as −0.002 Mpa, −0.004 Mpa, −0.005 Mpa, −0.008 Mpa, −0.009 Mpa, −0.01 Mpa, −0.02 Mpa, −0.03 Mpa, −0.04 Mpa, −0.05 Mpa, −0.06 Mpa, −0.07 Mpa, −0.08 Mpa, −0.09 Mpa, etc.

In a preferred technical solution of the present application, the vacuum degree of the sucking film process is controlled within the above specific range, within which the film can be forced to sag towards the substrate mold quickly and completely attach to the mold surface. If the vacuum degree of the sucking film process is too low, the rate of film sagging towards the substrate mold will be too low, and the sole will be prone to cracking subsequently if the film is forced to sag in when the foam material has been partially cured; at the same time, due to the low vacuum degree, the film will not be able to tightly attach to the inner side of the mold.

Preferably, in step (2), the sucking film is specifically pumping off the air between the film and the substrate mold.

Preferably, in step (2), a method of pumping off the air between the film and the substrate mold is: connecting at least two air outlets at textured sharp corners of the substrate mold, wherein the air outlets are air-communicating connected to a vacuuming system, and then starting the vacuuming system to pump off the air between the substrate mold and the film.

Preferably, in step (2), the sucking film is performed until the film is attached to the bottom of the substrate mold.

Preferably, in step (2), the foam material is hold for 0-5 min (such as 0.1 min, 0.2 min, 0.3 min, 0.4 min, 0.5 min, 0.6 min, 0.7 min, 0.8 min, 0.9 min, 1 min, 1.1 min, 1.2 min, 1.3 min, 1.4 min, 1.5 min, 1.6 min, 1.7 min, 1.8 min, 1.9 min, 2 min, 2.1 min, 2.2 min, 2.3 min, 2.4 min, 2.5 min, 2.6 min, 2.7 min, 2.8 min, 2.9 min, 3 min, 3.1 min, 3.2 min, 3.3 min, 3.4 min, 3.5 min, 3.5 min, 3.7 min, 3.8 min, 3.9 min, 4 min, 4.1 min, 4.2 min, 4.3 min, 4.4 min, 4.5 min, 4.6 min, 4.7 min, 4.8 min, 4.9 min, etc.) after being injected and then subjected to the next operation, and preferably the foam material is hold for 0.2-1.0 min.

In the present application, the foam material is preferably hold for 0-5 min (preferably 0.2-1.0 min) after being injected, leaving some time for the foam material to flow, and thus the foam material can fully cover the film. However, the holding time should not be too long, and the foam material will be partially cured in advance otherwise, leading to the fact that the substrate mold cannot be closed.

Preferably, in step (2), a method of the curing molding includes heating molding.

Preferably, in step (2), the heating molding has a temperature of 45-65° C., such as 46° C., 47° C., 48° C., 49° C., 50° C., 51° C., 52° C., 53° C., 54° C., 55° C., 56° C., 57° C., 58° C., 59° C., 61° C., 64° C., etc.

Preferably, in step (2), the heating molding has a time of 2-5 min, such as 2.1 min, 2.4 min, 2.6 min, 2.8 min, 3 min, 3.2 min, 3.6 min, 4.0 min, 4.2 min, 4.5 min, 4.8 min, etc.

Preferably, step (2) further includes: separating the sole from the film after taking out the sole obtained by the curing molding.

Preferably, step (2) specifically includes: first heating the film to 70-120° C., subsequently pouring the foam material onto the film and holding for 0-5 min, sucking the film to attach to the bottom of the substrate mold, closing the substrate mold, then performing heating molding at 45-65° C. for 2-5 min, taking out a sole obtained by the heating molding, and optionally separating the sole from the film to obtain the pore-free sole.

Preferably, the molding method further includes: step (3) is performed after step (2): trimming and arranging the pore-free sole, and packaging and storing the pore-free sole passing inspection.

In a preferred technical solution of the present application, the molding method specifically includes the following steps:

a. heating the substrate mold to 45-65° C., placing the film on the substrate mold and fixing the film between the substrate mold and the middle frame, and optionally coating a surface treating agent on the surface of the film;

b. heating the film to 70-120° C., pouring a foaming material onto the film and holding for 0-5 min to allow the foaming material to cover the film surface, sucking the film to attach to the bottom of the substrate mold, closing the substrate mold, then performing heating molding at 45-65° C. for 2-5 min, taking out a sole obtained by the heating molding, and optionally separating the sole from the film to obtain the pore-free sole; and c. trimming and arranging the pore-free sole, and packaging and storing the pore-free sole passing inspection.

A fifth object of the present application is to provide a pore-free sole obtained by the molding method according to the fourth object.

A sixth object of the present application is to provide a shoe including the pore-free sole according to the fifth object.

Compared with the prior art, the present application has the following beneficial effects.

The sole molding method provided by the present application breaks through the barrier of conventional foam product surface porosity technology, and the method wherein the foam material is injected first and then the film is sucked can prepare soles without porosity, which has all the advantages of comfort, wear resistance, no creasing for long time use and weather resistance; in addition, the molding method of the present application can be used to prepare low-density foam products and achieve the effect of low density and no peeling, thus replacing the complicated conventional material smearing process.

DETAILED DESCRIPTION

Embodiments of the present application are described below for a better understanding of the present application. It should be apparent to those skilled in the art that the embodiments are only used for a better understanding of the present application and should not be regarded as a limitation on the present application.

Example 1.1

This example provides a sole molding method, which is specifically as follows:

a. a substrate mold was heated to 55° C. and sprayed with a release agent, and a thermoplastic polyurethane film was fixed between the substrate mold and a middle frame, and evenly coated with a treating agent (purchased from Shanghai Momentive Co., Ltd., item No. DC-193);

b. the film (purchased from Huafon Thermoplastic Polyurethane Co., Ltd., item No. 3385A) was heated to 90° C. by infrared ray-carbon fiber lampshade irradiation, thermosetting polyurethane (Huafeng New Materials JF-I-600/JF-P-500, with a viscosity of 3200 mPa/s at 40° C.) was poured onto the film, and the film was sucked (with a vacuum degree of −0.05 MPa) to attach to the bottom of the substrate mold, held for 1 min, and then subjected to primary heating molding at 60° C. for 3 min to obtain a molded outer husk;

c. foam polyurethane (purchased from Huafeng New Materials, item No. JF-I-6322T/JF-P-6333) was poured onto the outer husk, the substrate mold was closed, secondary heating molding was performed at 50° C. for 3 min to obtain a molded inner core, and the molded inner core was cooled, released and separated from the film to obtain the sole; and d. the released product was trimmed, arranged, and then packaged and stored after passing inspection.

Figure 1A:
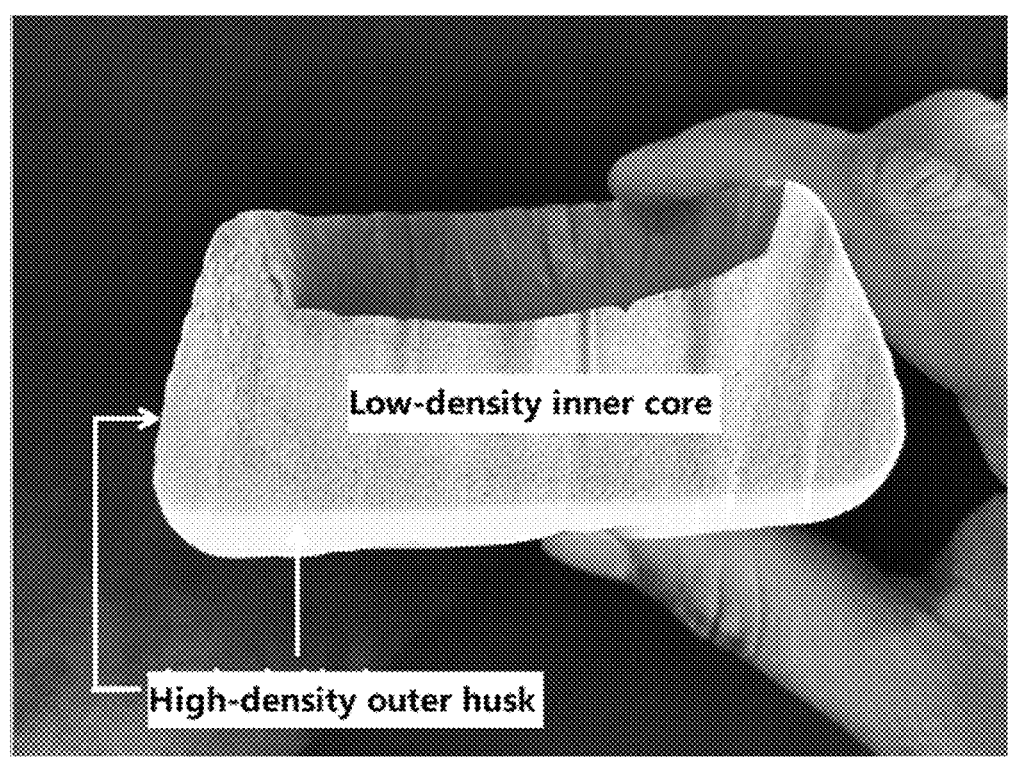
FIG. 1*a* is a cross-sectional picture of a product obtained by a product molding method provided in Example 1.1.
Figure 1B:
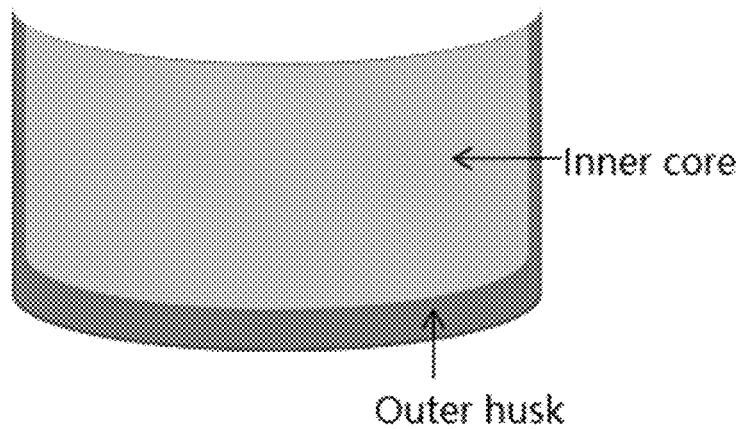
FIG. 1*b* is a cross-sectional diagram of a product obtained by a product molding method provided in Example 1.1.

The product obtained by the above molding method is shown in FIG. 1a and FIG. 1b, wherein the outer husk has a density of 1.1 g/cm$^3$, the inner core has a density of 0.32 g/cm$^3$, the sole achieves no pore, all-sided wrap, one-piece molding, and no adhesive, an overall density is 0.38, the dense outer husk provides excellent stain resistance, wear resistance and hydrolysis resistance, and the sole passes the 50,000-times flexing resistance test (5 mm) at −25° C. and shows no crease when worn.

Example 1.2

This example provides a bicycle saddle molding method, which is specifically as follows:

a. a substrate mold was heated to 55° C. and sprayed with a release agent, and a thermoplastic polyurethane film was fixed between the substrate mold and a middle frame;

b. the film (purchased from Huafon Thermoplastic Polyurethane Co., Ltd., item No. 3385A) was heated to 110° C. by infrared ray-carbon fiber lampshade irradiation, thermosetting polyurethane (Huafeng New Materials JF-I-600/JF-P-500, with a viscosity of 2800 mPa/s at 40° C.) was poured onto the film, and the film was sucked (with a vacuum degree of −0.08 MPa) to attach to the bottom of the substrate mold, held for 1 min, and then subjected to primary heating molding at 80° C. for 4 min to obtain an outer-substrate outer husk;

c. foam polyurethane (purchased from Huafeng New Materials, item No. JF-I-9818/JF-P-4170) was poured onto the outer husk, the substrate mold was closed, secondary heating molding was performed at 60° C. for 4 min to obtain a middle-substrate inner core, and the middle-substrate inner core was released to obtain the bicycle saddle; and d. the released bicycle saddle was trimmed, arranged, and then packaged and stored after passing inspection.

For the bicycle saddle product obtained by the above molding method, the outer husk has a density of 1.08 g/cm$^3$, the middle-substrate inner core has a density of 0.35 g/cm$^3$, the bicycle saddle has a low overall density and is soft and comfortable, the surface has no pore, the dense outer husk provides the product with excellent wear resistance, stain resistance and hydrolysis resistance.

Example 1.3

This example provides a sole molding method, which is specifically as follows:

a. a substrate mold was heated to 55° C. and sprayed with a release agent, and an elastic silicone film was fixed between the substrate mold and a middle frame;

b. the elastic silicone film (purchased from Hangzhou Bald Advanced Materials Co., Ltd., item No. KRR-200 μm) was heated to 90° C. by infrared ray-carbon fiber lampshade irradiation, thermosetting polyurethane (Huafeng New Materials Co., Ltd., JF-I-600/JF-P-500, with a viscosity of 3200 mPa/s at 40° C.) was poured onto the film, and the film was sucked (with a vacuum degree of −0.07 MPa) to attach to the bottom of the substrate mold, held for 1.5 min, and then subjected to primary heating molding at 60° C. for 3 min to obtain a molded outer husk;

c. foam polyurethane (purchased from Huafeng New Materials Co., Ltd., item No. JF-I-9818T/JF-P-4170) was poured onto the outer husk, the substrate mold was closed, secondary heating molding was performed at 60° C. for 3.5 min to obtain a molded inner core, and the molded inner core was released and separated from the silicone film to obtain the sole; and d. the released sole was trimmed, arranged, and then packaged and stored after passing inspection.

For the product obtained by the above molding method, the outer husk has a density of 1.2 g/cm$^3$, the inner core has a density of 0.22 g/cm$^3$, the sole achieves no pore, one-piece molding, and no adhesive, the dense outer husk and low-density foam layer provide the product with not only low density and wear comfort but also excellent stain resistance, wear resistance and hydrolysis resistance, and the appearance of the product has a bright shining effect.

Example 1.4

This example provides a child seat molding method, which is specifically as follows:

a. a substrate mold was heated to 80° C. and sprayed with a release agent, and a film was fixed between the substrate mold and a middle frame;

b. the elastic silicone film (purchased from Hangzhou Bald Advanced Materials Co., Ltd., item No. KRR-200 μm) was heated to 180° C. by infrared ray-carbon fiber lampshade irradiation, thermosetting polyurethane (purchased from Huafon Thermoplastic Polyurethane Co., Ltd., item No. 1385AC) was extruded and poured onto the film, (with a vacuum degree of –0.1 MPa) and the film was attached to the bottom of the substrate mold and held for 2 min, and the materials were cooled to less than 65° C. to obtain a molded outer husk;

c. foam polyurethane (purchased from Huafeng New Materials Co. Ltd., item No. JF-I-9818/JF-P-4107) was poured onto the outer husk, the substrate mold was closed, secondary heating molding was performed at 60° C. for 3 min to obtain a molded inner core, and the molded inner core was released and separated from the film to obtain the child seat; and d. the released product was trimmed, arranged, and then packaged and stored after passing inspection.

For the product obtained by the above molding method, the outer husk has a density of 1.2 g/cm³, the inner core has a density of 0.28 g/cm³, the dense outer husk of the seat has more excellent stain resistance, easier cleanable performance and good wear resistance compared with leather; the low-density foam layer provide the product with comfortable experience, and the wear resistance of the outer husk reaches less than or equal to 50 mm³, which greatly increases the serve life of the seat.

Comparative Example 1.1

This comparative example provides a sole molding method, which is specifically as follows:

a. a substrate mold was heated to 50° C. and sprayed with a release agent, and a film was fixed between the substrate mold and a middle frame;

b. the film was heated to 100° C. by infrared ray-carbon fiber lampshade irradiation, and the film was sucked (with a vacuum degree of 0.1 MPa) to attach to the bottom of the substrate mold;

c. foam polyurethane (purchased from Huafeng New Materials, item No. JF-I-6322T/JF-P-6333) was poured onto the film, the substrate mold was closed, secondary heating molding was performed at 120° C. for 6 min, and the materials were cooled and released to obtain the sole; and d. the released product was trimmed, arranged, and then packaged and stored after passing inspection.

Figure 2A:
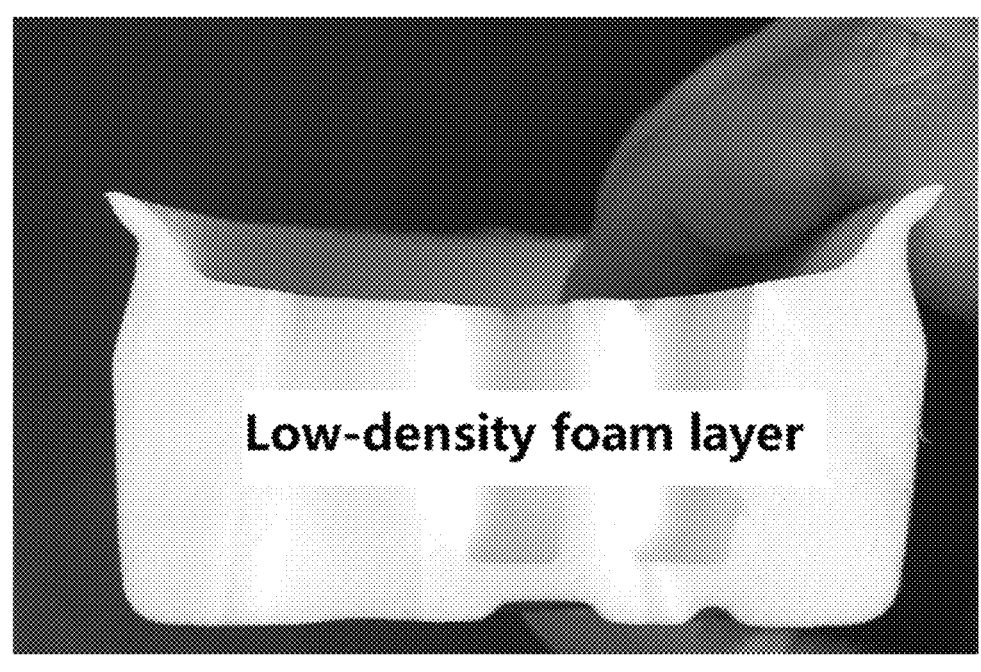
FIG. 2*a* is a cross-sectional picture of a product obtained by a product molding method provided in Comparative Example 1.1.
Figure 2B:
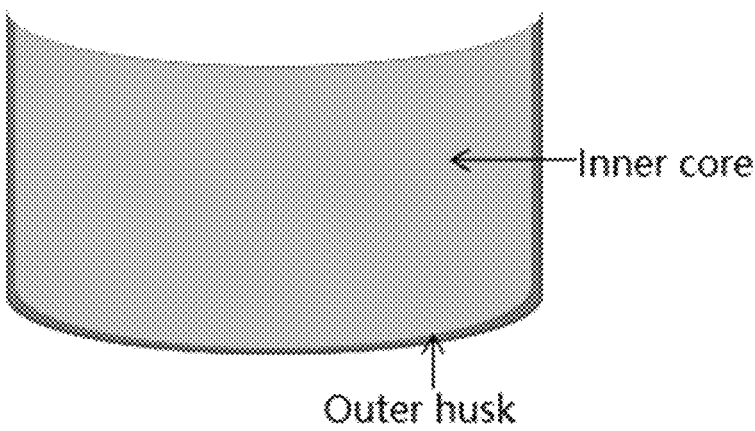
FIG. 2*b* is a cross-sectional diagram of a product obtained by a product molding method provided in Comparative Example 1.1.

The product obtained by the above molding method is shown in FIG. 2a and FIG. 2b, wherein the foam layer has a density of 0.38 g/cm³, and the product has pores and shows creases after worn for 2 days.

Example 2.1

This example provides a pore-free sole molding method, which is specifically as follows:

a. a substrate mold was heated to 55° C. and sprayed with a release agent, and a thermoplastic polyurethane film (purchased from Huafon Thermoplastic Polyurethane Co., Ltd., item No. 3385A) was fixed between the substrate mold and a middle frame, and evenly coated with a treating agent (purchased from Shanghai Momentive Co., Ltd., item No. DC-193);

b. the film was heated to 90° C. by infrared ray-carbon fiber lampshade irradiation, foam polyurethane (Zhejiang Huafeng New Materials Co., Ltd., item No. JF-I-6332T/JF-P-6333) was poured onto the film, and held for 0.5 min to fully cover the film surface, the film was sucked (with a vacuum degree of –0.05 MPa) to attach to the bottom of the substrate mold, the substrate mold was closed, heating molding was performed at 60° C. for 3 min, and the heating-molded sole was taken out to obtain the pore-free sole; and c. the pore-free sole was trimmed, arranged, and then packaged and stored after passing inspection.

Figure 3A:
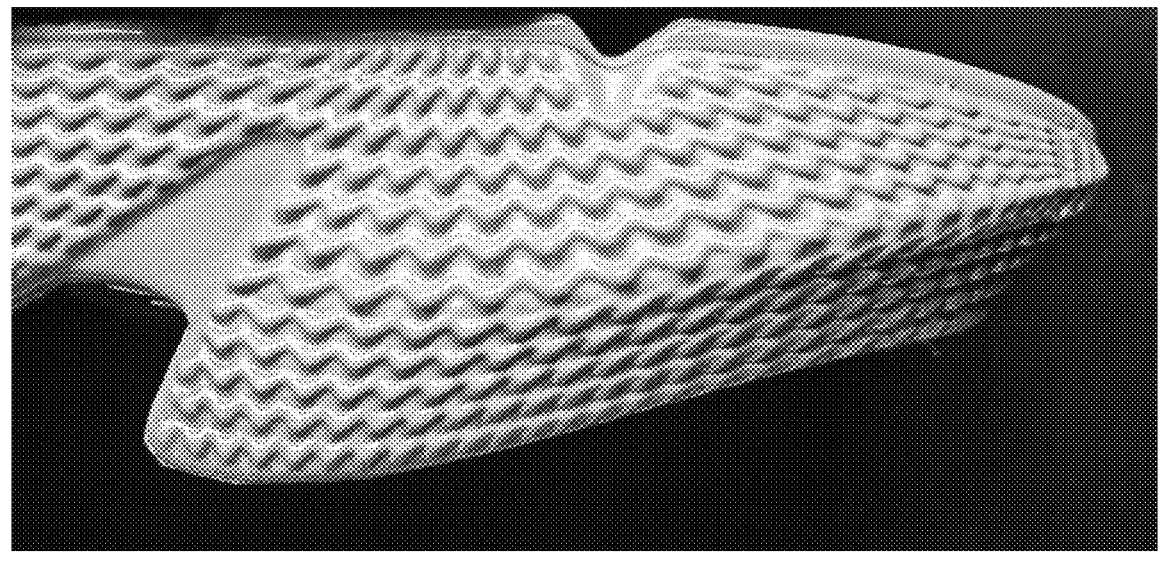
FIG. 3a shows a sole obtained by a molding method of Example 2.1.

The sole obtained by the above molding method is shown in FIG. 3a, and the sole has dense surface and no pore, the surface does not peel, the sole has a density of 0.2 g/cm³, passes the 50,000-times flexing resistance test (5 mm) at –25° C. and shows no crease when worn.

Example 2.2

This example provides a pore-free sole molding method, which is specifically as follows:

a. a substrate mold was heated to 45° C. and sprayed with a release agent, and a thermoplastic polyurethane film (purchased from Huafon Thermoplastic Polyurethane Co., Ltd., item No. 3385A) was fixed between the substrate mold and a middle frame, and evenly coated with a treating agent (purchased from Shanghai Momentive Co., Ltd., item No. DC-193);

b. the film was heated to 70° C. by infrared ray-carbon fiber lampshade irradiation, foam polyurethane (purchased from Zhejiang Huafeng New Materials Co., Ltd., item No. JF-I-8920/JF-P-6366) was poured onto the film, and held for 0.2 min to fully cover the film surface, the film was sucked (with a vacuum degree of –0.10 MPa) to attach to the bottom of the substrate mold, the substrate mold was closed, heating molding was performed at 45° C. for 5 min, and the heating-molded sole was taken out and separated from the film to obtain the pore-free sole; and c. the pore-free sole was trimmed, arranged, and then packaged and stored after passing inspection.

The sole obtained by the above molding method has dense surface and no pore, the surface does not peel, the sole has a density of 0.4 g/cm³, passes the 50,000-times flexing resistance test (5 mm) at –25° C. and shows no crease when worn.

Example 2.3

This example provides a pore-free sole molding method, which is specifically as follows:

a. a substrate mold was heated to 65° C. and sprayed with a release agent, and a silicone film (purchased from Hangzhou Bald Advanced Materials Co., Ltd., item No. KNY-500 μm) was fixed between the substrate mold and a middle frame;

b. foam polyurethane (purchased from Zhejiang Huafeng New Materials Co., Ltd., item No. JF-I-4118/JF-P-4170) was poured onto the film, and held for 1 min to fully cover the film surface, the film was sucked (with a vacuum degree of –0.1 MPa) to attach to the bottom of the substrate mold, the substrate mold was closed, heating molding was performed at 65° C. for 2 min, and the heating-molded sole was taken out and separated from the film to obtain the pore-free sole; and c. the pore-free sole was trimmed, arranged, and then packaged and stored after passing inspection.

The sole obtained by the above molding method has dense surface and no pore, the surface does not peel, the sole has a density of 0.7 g/cm³, passes the 50,000-times flexing resistance test (5 mm) at –25° C. and shows no crease when worn.

Example 2.4

This example provides a pore-free sole molding method, which is specifically as follows:

a. a substrate mold was heated to 55° C. and sprayed with a release agent, and an EVA film (purchased from Shenzhen Huilong Plastic Co., Ltd., item No. B07) was fixed between the substrate mold and a middle frame;

b. the film was heated to 90° C. by infrared ray-carbon fiber lampshade irradiation, foam thermosetting polyurethane (purchased from Zhejiang Huafeng New Materials Co., Ltd., JF-I-5818/JF-P-6333) was poured onto the film, and held for 0.5 min to fully cover the film surface, and the film was sucked (with a vacuum degree of –0.05 MPa) to attach to the bottom of the substrate mold, the substrate mold was closed, heating molding was performed at 60° C. for 3 min, and the heating-molded sole was taken out to obtain the pore-free sole; and c. the pore-free sole was trimmed, arranged, and then packaged and stored after passing inspection.

The sole obtained by the above molding method has dense surface and no pore, the surface does not peel, the sole has a density of 0.1 g/cm³, passes the 50,000-times flexing resistance test (5 mm) at –25° C. and shows no crease when worn.

Example 2.5

This example provides a pore-free sole molding method, which is specifically as follows:

a. a substrate mold was heated to 55° C. and sprayed with a release agent, and a thermoplastic polyurethane film (purchased from Huafon Thermoplastic Polyurethane Co., Ltd., item No. 3385A) was fixed between the substrate mold and a middle frame;

b. the film was heated to 90° C. by infrared ray-carbon fiber lampshade irradiation, foam EVA (Korea Hyundai Petrochemical Co., Ltd., item No. ES430/ES440) was poured onto the film, and held for 0.5 min to fully cover the film surface, the film was sucked (with a vacuum degree of –0.05 MPa) to attach to the bottom of the substrate mold, the substrate mold was closed, heating molding was performed at 60° C. for 3 min, and the heating-molded sole was taken out and separated from the film to obtain the pore-free sole; and c. the pore-free sole was trimmed, arranged, and then packaged and stored after passing inspection.

The sole obtained by the above molding method has dense surface and no pore, the surface does not peel, the sole has a density of 0.9 g/cm³, passes the 50,000-times flexing resistance test (5 mm) at –25° C. and shows no crease when worn.

Comparative Example 2.1

This comparative example differs from Example 2.1 only in step (2) that: the film (purchased from Huafon Thermoplastic Polyurethane Co., Ltd., item No. 3385A) was heated to 90° C. by infrared ray-carbon fiber lampshade irradiation, then the film was sucked (with a vacuum degree of –0.05 MPaa) to attach to the bottom of the substrate mold, foam polyurethane (purchased from Zhejiang Huafeng New Materials Co., Ltd., JF-I-6322T/JF-P-6333) was poured onto the film, the substrate mold was closed, heating molding was performed at 60° C. for 3 min, and the heating-molded sole was taken out to obtain the sole.

Figure 3B:
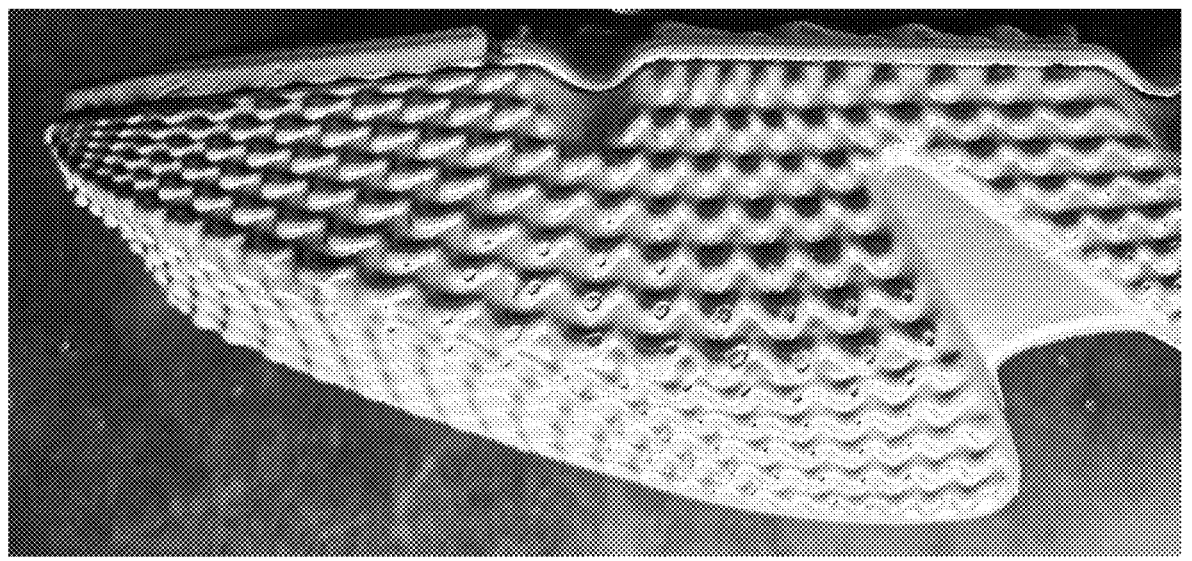
FIG. 3b shows a sole obtained by a molding method of Comparative Example 2.1.

The product obtained by the molding method of Comparative Example 2.1 is shown in FIG. 3b, there are lots of pores as shown in the picture, and the sole has a density of 0.2 g/cm³, fails to pass the 50,000-times flexing resistance test (5 mm) at –25° C. and shows creases after worn for 2 days.

Comparative Example 2.2

This comparative example provides a midsole molding method, which is specifically as follows:

a. a substrate mold was heated to 55° C. and sprayed with a release agent, and an EVA film was fixed between the substrate mold and a middle frame;

b. the film (purchased from Shenzhen Huilong Plastic Co., Ltd., item No. B07) was heated to 90° C. by infrared ray-carbon fiber lampshade irradiation, the film was sucked (with a vacuum degree of –0.05 MPa) to attach to the bottom of the substrate mold, foam thermosetting polyurethane (purchased from Zhejiang Huafeng New Materials Co., Ltd., item No. JF-I-5818/JF-P-6333) was poured onto the film, the substrate mold was closed, heating molding was performed at 60° C. for 3 min, and the heating-molded sole was taken out and separated from the film to obtain the pore-free sole; and c. the pore-free sole was trimmed, arranged, and then packaged and stored after passing inspection.

The sole obtained by the molding method of Comparative Example 2.2 has a density of 0.1 g/cm³, the surface peels seriously, and the side and bottom surfaces have lots of pores.

Comparative Example 2.3

This comparative example provides a midsole molding method, which is specifically as follows:

a. a substrate mold was heated to 55° C. and sprayed with a release agent, a thermoplastic polyurethane film was fixed between the substrate mold and a middle frame, and 60% air between the substrate mold and the film was pumped off to force the film to sag in towards the substrate mold;

b. foam polyurethane (Zhejiang Huafeng New Materials Co., Ltd., item No. JF-I-8920/JF-P-6366) was poured into the substrate mold, the substrate mold was closed, and the foam material encased in the film was allowed to foam; during the foaming process, the foam material was wrapped tightly by the film, air between the substrate mold and the film was extruded and expelled out, then the sole wherein the substrate mold, film and foam material were appressed to each other closely is subjected to curing molding at 55° C. for 5 min, and the heating-molded sole was cooled and released to obtain the midsole; and c. the released product was trimmed, arranged, and then packaged and stored after passing inspection.

The product obtained by the above molding method has a density of 0.2 g/cm³, the side and bottom surfaces have lots of pores, and the bottom texture is blurry because the film encasing the foam material cannot fully attach to the wall of the sole mold.

Comparative Example 2.4

This comparative example provides a midsole molding method, which is specifically as follows:

a. a substrate mold was heated to 55° C. and sprayed with a release agent;

b. foam polyurethane (purchased from Zhejiang Huafeng New Materials Co., Ltd., item No. JF-I-6322T/JF-P-6333) was poured into the substrate mold, the substrate mold was closed, heating molding was performed at 60° C. for 3 min, and the heating-molded sole was taken out to obtain the midsole; and c. the released product was trimmed, arranged, and then packaged and stored after passing inspection.

The sole obtained by the molding method of Comparative Example 2.4 has a molding density of 0.2 g/cm³, the surface peels seriously, and the side and bottom surfaces have lots of pores.

The applicant declares that although the embodiments are used in the present application to illustrate the detailed methods of the present application, the present application is not limited to the detailed methods, which means that the present application does not necessarily rely on the detailed methods to be implemented. It should be clear to those skilled in the art that any improvement to the present application, equivalent substitution of each raw material and addition of auxiliary components for the product of the present application, or selection of specific methods, etc., all fall within the protection scope and disclosure scope of the present application.

What is claimed is:

1. A product molding method, comprising the following steps:

(1) placing a film on a substrate mold, and fixing the film between the substrate mold and a middle frame;

(2) placing an outer husk material on the film, sucking the film to sag in towards the substrate mold, attaching the film to a bottom of the substrate mold, holding for 0-5 min, and performing primary curing molding to obtain a molded outer husk; and (3) placing an inner core material in the molded outer husk, performing secondary curing molding to obtain a molded inner core, and releasing the molded inner core to obtain the product, the outer husk material is placed on the film and then the film is sucked, as the film sags in towards the substrate mold, the outer husk material flows with a deformation of the film, forming an outer husk material layer in a hollow of the film;

the outer husk material wraps a side and bottom of the inner core material;

wherein the outer husk material has a melt viscosity of 1000-5000 mPa/s at 20-450C.

2. The product molding method according to claim 1, wherein the film is a deformable elastic film.

3. The product molding method according to claim 2, wherein the film is any one of a thermoplastic organic film, a thermosetting organic film or a photocurable organic film.

4. The product molding method according to claim 3, wherein the film is any one of an ethylene-vinyl acetate copolymer film, a silicone-type film, a polyvinyl chloride film, a polyethylene film, a rubber film, a thermoplastic polyurethane film or a thermosetting polyurethane film, or a polypropylene film, or a composite film formed by at least two of them.

5. The product molding method according to claim 1, wherein step (1) further comprises: coating a surface treating agent on a surface of the fixed film.

6. The product molding method according to claim 5, wherein the surface treating agent comprises a film anti-adhesive agent.

7. The product molding method according to claim 6, wherein the surface treating agent comprises any one or a combination of at least two of an aqueous release agent, an oil-based release agent or a silicone oil-based additive.

8. The product molding method according to claim 1, wherein step (1) further comprises: heating the substrate mold to 45-85° C.

9. The product molding method according to claim 1, wherein step (1) further comprises: heating the substrate mold to 45-65° C.

10. The product molding method according to claim 1, wherein in step (2), a method of placing the outer husk material comprises one or a combination of at least two of pouring, extruding, spraying, brushing, blow molding or pressing.

11. The product molding method according to claim 1, wherein in step (3), the secondary curing molding is performed at 45-65° C.

12. The product molding method according to claim 11, wherein in step (3), the secondary curing molding is performed for 2-4 min.

13. The product molding method according to claim 1, wherein the outer husk material comprises any one or a combination of at least two of a thermosetting organic material, a photocurable organic material or a thermoplastic organic material.

14. The product molding method according to claim 1, wherein the outer husk material has a density of 0.8-1.5 g/cm³.

15. The product molding method according to claim 1, wherein the inner core material comprises any one or a combination of at least two of a thermosetting organic material, a photocurable organic material, a thermoplastic organic material or a rubber-type material.

16. The product molding method according to claim 1, wherein the inner core material has a density of 0.15-0.45 g/cm³.

17. The product molding method according to claim 1, wherein step (2) further comprises: heating the film to 70-120° C. before sucking the film.

18. The product molding method according to claim 17, wherein in step (2), the film is heated by infrared ray-carbon fiber lampshade irradiation.

19. The product molding method according to claim 1, wherein in step (2), sucking the film at a vacuum degree of 0.05 Mpa to −0.1 Mpa.

20. The product molding method according to claim 1, wherein in step (2), sucking the film is specifically pumping off air between the film and the substrate mold.

21. The product molding method according to claim 20, wherein in step (2), a method of pumping off air between the film and the substrate mold is:

connecting at least two air outlets at textured sharp corners of the substrate mold, wherein the air outlets are air communicating connected to a vacuuming system, and then starting the vacuuming system to pump off air between the substrate mold and the film.

22. The product molding method according to claim 1, wherein in step (2), the primary curing molding has a temperature of 45-65° C.

23. The product molding method according to claim 22, wherein in step (2), the primary curing molding has a time of 2-5 min.

24. The product molding method according to claim 1, wherein step (2) specifically comprises: heating the film to 70-120° C., pouring the outer husk material onto the film, sucking the film to attach to the bottom of the substrate mold and holding for 0-5 min, and then performing the primary curing molding at 45-65° C. for 2-5 min to obtain the molded outer husk.

25. The product molding method according to claim 1, wherein step (3) further comprises: closing the substrate mold after pouring the inner core material.

26. The product molding method according to claim 1, wherein step (3) specifically comprises: pouring the inner core material onto the molded outer husk, closing the substrate mold, performing secondary curing molding at 45-65° C. for 2-4 min to obtain the molded inner core, cooling, releasing, and optionally peeling off the film to obtain the product.

27. The product molding method according to claim 1, wherein step (4) is performed after step (3): trimming and arranging the released product, and packaging and storing the product passing inspection.

28. The product molding method according to claim 27, wherein the product molding method comprises the following steps:

(1) fixing the film between the substrate mold and the middle frame, and optionally coating a surface treating agent on the surface of the film;

(2) heating the film to 70-120° C., pouring the outer husk material onto the film, sucking the film to attach to the bottom of the substrate mold and holding for 0-5 min, and then performing the primary curing molding at 45-65° C. for 2-5 min to obtain the molded outer husk;

(3) pouring the inner core material onto the molded outer husk, closing the substrate mold, performing the second curing molding at 45-65° C. for 2-4 min to obtain a molded inner core, cooling, releasing, and optionally peeling the film to obtain the product; and (4) trimming and arranging the released product, and packaging and storing the product passing inspection.

\* \* \* \* \*